United States Patent
Georgescu et al.

(10) Patent No.: US 7,421,101 B2
(45) Date of Patent: Sep. 2, 2008

(54) SYSTEM AND METHOD FOR LOCAL DEFORMABLE MOTION ANALYSIS

(75) Inventors: Bogdan Georgescu, Highland Park, NJ (US); Xiang Sean Zhou, Plainsboro, NJ (US); Dorin Comaniciu, Princeton Jct., NJ (US); Sriram Krishnan, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 539 days.

(21) Appl. No.: 10/957,380

(22) Filed: Oct. 1, 2004

(65) Prior Publication Data

US 2005/0074154 A1 Apr. 7, 2005

Related U.S. Application Data

(60) Provisional application No. 60/566,833, filed on Apr. 30, 2004, provisional application No. 60/510,856, filed on Oct. 13, 2003, provisional application No. 60/508,367, filed on Oct. 3, 2003, provisional application No. 60/508,210, filed on Oct. 2, 2003.

(51) Int. Cl.
*G06K 9/00* (2006.01)

(52) U.S. Cl. .................. 382/128; 382/103; 382/168; 382/107

(58) Field of Classification Search ............ 382/107, 382/103, 168, 128
See application file for complete search history.

(56) References Cited

U.S. PATENT DOCUMENTS 6,335,985 B1 1/2002 Sambonsugi et al.
2002/0146158 A1 10/2002 Allouche .............. 382/128

OTHER PUBLICATIONS

Dufaux et al., "bacground Mosaicking for Low Bit Rate Video Coding," Sep. 16-19, 1996, IEEE, vol. 1, pp. 673-676.*
Mikic I et al., "Segmentation and Tracking in Echocardiographic Sequences: Active Contours Guided by Optical Flow Estimates," Apr. 1998, IEEE, vol. 17, pp. 274-284.*
Cootes et al., "Active shape models—'smart snakes'" in Proc. British Machine Vision Conference, 1992, pp. 266-275.
Turk et al., "Face recognition using eigen-face", in Proc. IEEE Conf. on Computer Vision and Pattern Recognition, Hawaii, 1991, pp. 586-591.
Leedan et al., "Heteroscedastic regression in computer vision: Problems with bilinear constraint", Int'l Journal of Computer Vision 37 (2000), pp. 127-150.

(Continued)

*Primary Examiner*—Matthew C. Bella
*Assistant Examiner*—John W Lee
(74) *Attorney, Agent, or Firm*—Michele L. Conover

(57) ABSTRACT

A system and method for local deformable motion analysis accurately tracks the motion of an object such that local motion of an object is isolated from global motion of an object. The object is viewed in an image sequence and image regions are sampled to identify object image regions and background image regions. The motion of at least one of the identified background image regions is estimated to identify those background image regions affected by global motion. Motion from multiple background image regions are combined to measure the global motion in that image frame. The measured global motion in the object image regions are compensated to measure local motion of the object and the local motion of the object is tracked.

14 Claims, 7 Drawing Sheets

OTHER PUBLICATIONS

Kanazawa et al., "Do we really have to consider covariance matrices for image features?", Proc. Int'l Conf. on Computer Vision, Vancouver, Canada, vol. II, 2001, pp. 586-591.

Irani et al., "Factorization with uncertainty", Proc. 6th European Conf. on Computer Vision, Dublin Ireland, 2000, pp. 539-553.

Jacob et al., "Robust contour tracking in echocardiographic sequence", Proc. Int'l Conf. on Computer Vision, Bombay, India, 1998, pp. 408-413.

Paragios, "A variational approach for the segmentation of the left ventricle in cardiac images", Proc. IEEE Workshop on Variational and Level Set Methods in Computer Vision, Vancouver, Canada, 2001.

Goldenberg et al., "Cortex segmentation: A fast variational geometric approach", IEEE Trans. Medical Imaging 21, 2002, pp. 1544-1551.

Wang et al., "Landmark-based shape deformation with topology-preserving constraints", Proc. Int'l Conf. on Computer Vision, Nice France, 2003.

Black et al., "Robust matching and tracking of articulated objects using a view-based representation", Proc. European Conference on Computer Vision, Cambridge, UK, 1996, pp. 610-619.

Bar-Shalom et al., "The effect of the common process noise on the two-sensor fused track covariance", IEEE Trans. Aero. Elect. Syst. AES-22, 1986, pp. 803-805.

Li et al., "Unified optimal linear estimation fusion—part i: Unified models and fusion rules", Proc. Of 3rd Int'l Conf. on Information Fusion, Paris, France, 2000, MoC2-10-MoC2-17.

Hall et al., "Merging and splitting eigenspace models", IEEE Trans. Pattern Anal. Machine Intelligence 22, 2000, pp. 1042-1048.

Comaniciu, "An algorithm for data-driven bandwidth selection", IEEE Trans. Pattern Anal. Machine Intelligence 25, 2003, pp. 281-288.

Akgul et al, "A coarse-to-fine deformable contour optimization framework", IEEE Trans. Pattern Analysis Machine Intelligence 25, 2003, pp. 174-186.

Brand et al., "Flexible flow for 3D nonrigid object tracking and shape recovery", Proc. IEEE Conf. on Computer Vision and Pattern Recognition, Hawaii, vol. 1, 2001, pp. 315-322.

Irani, "Multi-frame optical flow estimation using subspace constraints", Proc. Int'l Conf. on Computer Vision, Kerkyra, Greece, 1999, pp. 626-633.

Mignotte et al., "Endocardial boundary estimation and tracking in echocardiographic images using deformable templates and markov random fields", Pattern Analysis and Applications, vol. 4(4), pp. 256-271, Nov. 2001.

Althoff et al., "Tracking contrast in echocardiography by a combined snake and optical flow technique", IEEE Computers in Cardiology, Cambridge, USA, vol. 3653, Sep. 2000, pp. 29-32.

Comaniciu et al. "Real-time tracking of non-rigid objects using mean shift", Proc. IEEE Conf. on Computer Vision and Pattern Recog., Hilton Head, SC, vol. II, Jun. 2000, pp. 142-149.

Swain et al., "Color indexing", Int'l Journal of Computer Vision, vol. 7, No. 1, pp. 11-32, Jun. 6, 1991.

Rubner et al., "A metric for distributions with applications to image databases", Proc. Int'l Conf. on Computer Vision, Bombay, India, 1998, pp. 59-66.

Comaniciu et al., "Kernel-based object tracking", IEEE Trans. On Pattern Analysis and Machine Intelligence, vol. 25, No. 4, pp. 564-575, 2003.

Puzicha et al., "Empirical evaluation of dissimilarity measures for color and texture", Proc. 7th Int'l Conf. on Computer Vision, Kerkyra, Greece, 1999, pp. 1165-1173.

Rubner at al., "The earth mover's distance, multi-dimensional scaling, and color-based image retrieval", Proc. DARPA Image Understanding Workshop, May 1997, pp. 661-668.

Levina et al., "The earth mover's distance is the mallows distance: some insights from statistics", Proc. 8th Int'l Conf. on Computer Vision, Vancouver, Canada, vol. 2, 2001, pp. 251-246.

Kumar et al., "Triplet geometric representation: A novel scale, translation and rotation invariant feature representation based on geometric constraints for recognition of 2d object features", Image and Vision Computing, vol. 15(3), Mar. 1997, pp. 235-249.

Perez et al., "Color-based probabilistic tracking", Proc. European Conf. on Computer Vision, Copenhagen, Denmark, vol. I, 2002, pp. 661-675.

Cootes et al., "Statistical models of appearance for medical image analysis and computer vision", Proc. SPIE Medical Imaging, 2001, pp. 236-248.

Chalana et al., "A methodology for evaluation of boundary detection algorithms on medical images", mi, vol. 5, pp. 642-652, Oct. 1997.

Georgescu et al., "Multi-model component-based tracking using robust information fusion", 2nd Workshop on Statistical Methods in Video Processing, Praque, Czech Republic, 2004.

Meijering et al., "Retrospective motion correction in digital subtraction angiography: A review", IEEE Trans. Medical Imaging, vol. 18, No. 1, pp. 2-21, 1999.

Baroni et al., "Assessing lv wall motion by frame-to-frame curvature matching and optical flow", Comput. Cardiology, pp. 477-480, 1991.

Chen et al., "Modeling, Analysis and Visualization of Left Ventricle Shape and Motion by Hierarchical Decomposition", IEEE Trans. Pattern Analysis and Machine Intelligence, vol. 16, No. 4, pp. 342-356, 1994.

Chunke et al., "Motion analysis of echocardiograph using optical flow method", Proceedings of 1996 IEEE Int'l Conf. on Systems, Man and Cybernetics, No. 10, pp. 672-677.

Clarysse et al., "Tracking Geometrical Description on 3-D Deformable Surfaces: Application to the left-ventricular surface of the heart", IEEE Trans. On Medical Imaging, vol. 16, No. 4, Aug. 1997.

Coppini et al., "Artificial vision approach to the understanding of heart motion", J. Biomed Eng. 2, pp. 321-327, 1992.

Elsen et al., "Medical image matching—A review with classification", IEEE Eng. Med. Biol. 26-39, 1993.

Faber et al., "Orientation of 3-D structures in medical images", IEEE Trans. Pattern Analysis Machine Intelligence, 10: 626-633, 1988.

Figueiredo et al., "Bayesian estimation of ventricular contours in angiographic images", Med. Img. (11), No. 3, Sep. 1992, pp. 416-429.

Fisher et al., "True myocardial motion tracking", Magnetic Res. Med. 1994, pp. 401-413.

Garot et al., "Fast determination of regional myocardial strain fields from tagged cardiac images using harmonic phase (HARP) MRI", Circulation, 101(9) pp. 981-988, Mar. 2000.

Gorce et al., "Three-dimensional velocity field estimation of moving cardiac walls", Computers in Cardiology 1994, vol. 0276-6547/94, pp. 489-492.

Guttman et al., "Tag and contour detection in tagged MR images of the left ventricle", 1992, submitted to IEEE Trans. On Medial Imaging.

Jacob et al. "Quantitative regional analysis of myocardial wall motion", Ultrasound in Medicine and Biology 2001, vol. 27, No. 6, pp. 773-778.

Kambhamettu et al., "Point correspondence recovery in non-rigid motion", IEEE Conf. on Computer Vision and Pattern Recognition, pp. 222-227, 1992.

Klein et al., "Four-dimensional processing of deformable cardiac PET data", Med. 2002 Image Anal. 6, pp. 29-46.

Mailloux et al., "Restoration of the velocity field of the heart from two-dimensional echocardiograms", IEEE Transactions on Biomedical Imaging, vol. 8, No. 2, pp. 143-153, 1989.

Sermesant et al., "Progress towards an electro-mechanical model of the heart for cardiac image analysis", IEEE Int'l Symposium on Biomedical Imaging (ISBI'02), pp. 10-14, 2002.

Suehling et al., "Motion analysis of echocardiograms using a local-affine spatio-temporal model", Proceedings of the First 2002 IEEE Int'l Symposium on Biomedical Imaging: Macro to Nano (ISBI'02), Washington, DC, USA, Jul. 7-10, 2002, vol. 11, pp. 573-576.

Wang et al., "Fast LV motion estimation using subspace approximation techniques", IEEE Transactions on Medical Imaging, vol. 20, No. 6, Jun. 2001, pp. 499-513.

Young et al., "Two-dimensional left ventricular deformation during systole using magnetic resonance imaging with spatial modulation of magnetization", Circulation, 1994:89, pp. 740-752.

Kanazawa Y et al, "Do We Really Have to Consider Covariance Matrices for Image Features?", *Proceedings of the Eight IEEE International Conference on Computer Vision*, Vancouver, British Columbia, Canada, Jul. 7-14, 2001, International Conference on Computer Vision, Los Alamitos, CA: IEEE Comp. Soc., US, vol. vol. 1 of 2, Conf. 8, Jul. 7, 2001, pp. 301-306.

Chalana V et al, A Multiple Active Contour Model for Cardiac Boundary Detection on Echocardiographic Sequences, *IEEE Transactions on Medical Imaging*, IEEE Inc., New York, US, vol. 15, No. 3, Jun. 1996, pp. 290-298.

Sullivan J et al, Object Localization by Bayesian Correlation, *Computer Vision, 1999, The Proceedings of the Seventh IEEE International Conference on Kerkyra*, Greece, Sep. 20-27, 1999, Los Alamitos, CA, USA, IEEE Computer Society, US, vol. 2, Sep. 20, 1999, pp. 1068-1075.

Malassiotis S et al, "Tracking the Left Ventricle in Echocardiographic Images by Learning Heart Dynamics", *IEEE Transactions on Medical Imaging*, IEEE Inc., New York, US, vol. 18, No. 3, Mar. 1999, pp. 282-290.

Jacob G et al, "A Shaped-Space-Based Approach to Tracking Myocardial Borders and Quantifying Regional Left-Ventricular Function Applied in Echocardiography", *IEEE Transactions on Medical Imaging*, IEEE Inc., New York, US, vol. 21, No. 3, Mar. 2002, pp. 226-238.

Zhou X S et al, "A Unified Framework for Uncertainty Propagation in Automatic Shape Tracking", *Computer Vision and Pattern Recognition*, 2004, Proceedings of the 2004 IEEE Computer Society Conference on Washington, DC USA Jun. 27-Jul. 2, 2004, Piscataway, NJ, USA, IEEE, vol. 1, Jun. 27, 2004, pp. 872-879.

Search Report (including Notification of Transmittal of the International Search Report, International Search Report, and Written Opinion of the International Searching Authority), Aug. 2, 2005.

Comaniciu, "Nonparametric information fusion for motion estimation", Proc. IEEE Conf. on Computer Vision and Pattern Recognition, Cambridge, UK, 1996, pp. 610-619.

Julier et al., "A non-divergent estimation algorithm in the presence of unknown correlations", Proc. American Control Conf., Alberquerque, NM, 1997.

Cootes et al., "Statistical models for appearance for computer vision", 2001, unpublished manuscript, available at http://www.wiau.man.ac.uk/~bim/Models/ap.model.ps.qz.

Mikic et al., "Segmentation and tracking in echocardiographic sequences: Active contours guided by optical flow estimates", IEEE Trans. Medical Imaging 17, 1998, pp. 274-284.

Bregler et al., "Recovering non-rigid 3D shape from image streams", Proc. IEEE Conf. on Computer Vision and Pattern Recognition, Hilton Head, SC, Vo. II, 2000, pp. 690-696.

Cremers et al., "Nonlinear shape statistics in mumford-shah based segmentation", Proc. European Conf. on Computer Vision, Copenhangen, Denmark, 2002, pp. 93-108.

Black et al., "The robust estimation of multiple motions: Parametric and piecewise-smooth flow fields", Computer Vision and Image Understanding 63, 1996, pp. 75-104.

Krahnstoever et al., "Robust probabilistic estimation of uncertain appearance for model based tracking", Proc. Of IEEE Workshop on Motion and Video Computing, Orlando, FL, USA, Dec. 2002.

Meijering et al., "Reduction of patient motion artifacts in digital substraction angiography: Evaluation of a fast and fully automatic technique", Radiology, vol. 219, No. 1, pp. 288-293, 2001.

Azhari et al., "Three-dimensional mapping of acute ischemic regions using MRI: wall thickening versus motion analysis", Am. J. Physiol., 259 (Heart Circ. Physiol. 28, pp. H1492-H1503, 1990.

Bolson et al., "Left ventricular segmental wall motion: a new method using local direction information", Computers in Cardiology, Long Beach, CA, IEEE Computer Society Press, 1981, pp. 245-248.

Chandrashekara et al., "Analysis of myocardial motion in tagged MR images using nonrigid image registration", Proc. Medical Image Understanding and Analysis, MIUA, Portsmouth, United Kingdom, Jul. 2002, pp. 1-4.

Mancini et al., "Quantiative regional curvature analysis: An application of shape determination for the assessment of segmental left ventricular function in man", AM Heart Journal, 113(2), pp. 326-334, 1987.

Papademetris et al., "Estimation of 3D left ventricular deformation from echocardiography", Medical Image Analysis, In-Press (Mar. 2001).

Potel et al., "Three-dimensional left ventricular wall motion in man coordinate systems for representing wall movement direction", Investigative Radiol., 19, pp. 499-509, 1984.

Rabiner et al., "On the use of autocorrelation analysis for pitch detection", IEEE Trans. On Acoustics, Speech and Signal Processing, vol. 25, No. 1, pp. 24-33, Feb. 1977.

Schmid et al., "Determination of displacement, stress-and-strain-distribution in the human heart: A FE-model on the basis of MR Imaging", Tech & Health Care 3 (1995), pp. 209-214.

Dufaux et al., "Background mosaicking for low bit rate video coding", Proceedings of the Int'l Conf. on Image Processing, Lausanne, Sep. 16-19, 1996, vol. 1, pp. 673-676.

Mikic et al., "Segmentation and Tracking in Echocardiography Sequences: Active Contours Guided by Optical Flow Estimates", IEEE Trans. On Medical Imaging, vol. 17, No. 2, Apr. 1998, pp. 274-284.

Hein et al., "Current time-domain methods for assessing tissue motion by analysis from reflected ultrasound echoes—a review", IEEE Transactions on Ultrasonics, Ferroelectrics and Frequency Control, vol. 40, No. 2, Mar. 1993, pp. 84-102.

D'Hooge et al., "Evaluation of transmural myocardial deformation and reflectivity characteristics", 2001 IEEE Ultrasonics Symposium Proceedings, Atlanta, GA, Oct. 7-10, 2001, vol. 2 of 2, pp. 1185-1188.

Kang et al., "A visual tracking algorithm by integrating rigid model and snakes", Intelligent Robot and Systems '96 IROS 96, Proceedings of the 1996 LEEE/RSJ Int'l Conf. on Osaka, Japan, Nov. 4-8, 1996, vol. 2, pp. 777-784.

Seitz et al, "View-Invariant Analysis of Cyclic Motion", Int'l Journal of Computer Vision, Kluwer Academic Publishers, Norwell, US, vol. 25, No. 3, Dec. 1997, pp. 231-251.

Zhou et al., "An Information Fusion Framework For Robust Shape Tracking", 3rd Int'l Workshop on Statistical and Computational Theories of Vision SCTV 2003, Session 2 Statistical Models For Motion, Together with ICCV 2003, Oct. 12, 2003, pp. 1-24.

* cited by examiner

FIG. 4
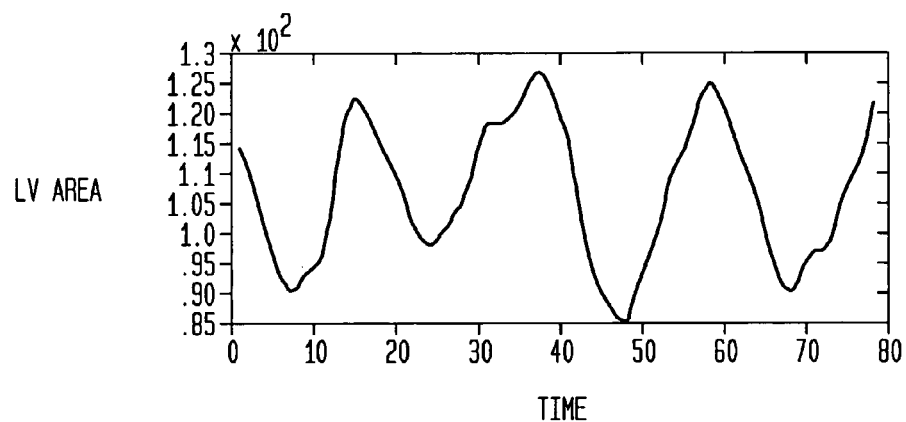
FIG. 5A  FIG. 5B  FIG. 5C  FIG. 5D
 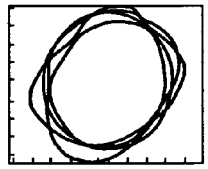  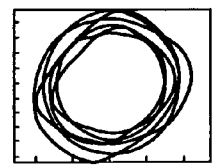

SYSTEM AND METHOD FOR LOCAL DEFORMABLE MOTION ANALYSIS

CROSS REFERENCE TO RELATED APPLICATIONS

This application claims the benefit of U.S. Provisional Application Ser. No. 60/508,367, filed on Oct. 3, 2003, U.S. Provisional Application Ser. No. 60/510,856, filed on Oct. 13, 2003, U.S. Provisional Application Ser. No. 60/508,210, filed on Oct. 2, 2003 and U.S. Provisional Application Ser. No. 60/566,833, filed on Apr. 30, 2004 which are incorporated by reference in their entirety.

FIELD OF THE INVENTION

The present invention is directed to a system and method for local deformable motion analysis, and more particularly, to a system and method for accurately tracking motion of an object isolating local motion of an object from global motion of an object.

BACKGROUND OF THE INVENTION

Object tracking in an important tool used in many imaging software applications. One issue that commonly arises in tracking the motion of an object is distinguishing the movement of an object from a moving background. An example of a scenario is recognizing movement of human features such as head movements, facial features, hand movements or other body movements. In imaging the target image, it becomes clear that the background scenery is also moving in the image (e.g., trees, vehicles, and people). This makes it difficult to track the object, for example, a facial feature. The imaging software must be able to adequately distinguish between the target (i.e., the particular facial feature) and the other image data.

Object tracking is also important in medical imaging applications such as echocardiography. Accurate analysis of the myocardial wall motion in cardiac ultrasound images is crucial for the evaluation of the heart function. One of the difficulties in tracking myocardial wall function is to compensate for additional motion introduced by breathing, movement of the body or the ultrasound probe. The effects of these motions can be reduced either during image acquisition by preventing patient motion (breath-holding, careful probe placement) or in the post-processing stage through image-based correction techniques. However, true cardiac motion cannot be obtained without compensating the external motion.

Cardiac motion can be broken down into local motion and global motion. Local motion refers to the internal movements of the heart. In other words, it is the movement of the myocardium during systole and diastole. Global motion is the external movements other than the local motion. As indicated above, it can originate from many sources such as small body motion or breath of the patient or the movement of the imaging device or hand of the radiologist while imaging.

If no compensation is made for global motion, misdiagnosis can occur. For example, without compensation a patient may be diagnosed with ischemia at the right side of the left ventricle because the contraction of the right segments looks much less than other segments. This could happen because global motion to the right would offset the motion of the right wall and amplify the motion of the left wall. After compensation, the contractions in each segment are similar, which indicates normal movement of the heart. Likewise, a patient may be diagnosed with a normal heart but have an ischemia. An ischemic left ventricle may be regarded as normal if global motion exists. In many instances, the existence of global motion may affect the accuracy of diagnosis, regardless of whether the diagnosis is made by a doctor or an intelligent machine.

Previous methods for compensating for global motion include long axis and principal axis methods. Principal axis is defined as the line in space that has the weighted least-squared distances from the centroids of all the given cross sections. The left ventricle centroid at the end of systole has been used with the principal axis to determine the translation and rotation factors. The image data and principal axis are obtained for two continuous image frames. The centroid is decided by a certain predefined frame (e.g., end-of-systole). Two frames are then overlapped to decide the translation by the movement of the centroid. After translation, the rotation angle can be decided and compensation can be achieved by the translation and rotation factors. The principal axis is not widely used for global motion compensation because it does not adequately identify an ischemic region of a heart or similar analysis. The principal axis is affected by abnormal regions movement and cannot be used to determine true motion.

Another method presumes that the shape of a normal heart remains almost the same during systole. In the case of an ischemic heart, the motion is significantly modified in and around the infarcted zone resulting in hypokinesia, akinisia, or dyskiniesia. The global shape and curvedness distribution is observed during the heart cycle as well as the local shape for a number of data points (e.g., apex, anterior and pit). The global and local shape and curvedness distribution of each data point are combined together to compare with normal heart data and then the abnormal regions can be determined. In the local region tracking, the principal axes are used to compensate the global motion. The problem with this method in identifying the abnormal region lies with the original assumption that was made. As indicated above, the assumption was made that the shape of a normal heart remains the same during systole. However, the heart itself has local rotation or torsion and the shape of a normal heart can be very different during systole in many instances. There is a need to adequately compensate for global motion in order to improve the accuracy of medical diagnoses.

SUMMARY OF THE INVENTION

The present invention is directed to a system and method for local deformable motion analysis. In a first embodiment of the present invention, an object is viewed in an image sequence. Image regions are sampled to identify object image regions and background image regions. Motion of at least one of the identified background image regions is estimated to identify those background image regions affected by global motion. Motion from multiple background image regions is combined to measure the global motion in that image frame. The measured global motion in the object image regions is compensated for to measure local motion of the object, and the local motion of the object is tracked. Optical flow techniques and information fusion techniques are employed to estimate the motion of the object.

In a second embodiment of the present invention, local motion deformity of an image of an object is measured by identifying a plurality of control points contained in background image regions. Local motion vectors including uncertainty for the identified plurality of control points are measured. Each control point in subsequent image frames is independently tracked. The location of the control point and its uncertainty is represented using a covariance matrix. The location and covariance matrix are used to estimate the global motion. The global motion is used as a reference to obtain the true local object deformations.

In accordance with a third embodiment of the present invention, local motion deformity of an image of an object is measured by identifying a first plurality of points which represent an outer contour of the object. A second plurality of points are identified which represent an inner contour of the object. Movement of the first plurality of points and the second plurality of points are tracked through image frames such that each image frame represents a predefined period of time.

In accordance with a fourth embodiment of the present invention, local deformity of an image of an object is measured by identifying a plurality of control points that represent a contour of the object. Movement of the control points in subsequent image frames is tracked. A dual histogram is used to represent the distribution of intensities in a vicinity of the tracked control points.

In accordance with a fifth embodiment of the present invention, a method is disclosed for determining a region containing an ultrasound signal in images. Static and dynamic regions of an image are identified. Boundary points of the dynamic region are determined. A parametric shape model is fitted to the boundary points.

BRIEF DESCRIPTION OF THE DRAWINGS

Preferred embodiments of the present invention will be described below in more detail, wherein like reference numerals indicate like elements, with reference to the accompanying drawings:

FIG. 4 is a graph depicting the size of a left ventricle area versus time;

FIGS. 5a-5d illustrate dominant eigenshapes for two views of a left ventricle and its corresponding PCA model;

DETAILED DESCRIPTION

The present invention is directed to a method for tracking local deformable motion of an object. An example where such a method would be utilized is for tracking the local motion of a myocardial wall to detect regional wall motion abnormalities in the heart. The method may also be used to track the endocardial wall or epicardial wall of the heart. It is to be understood by those skilled in the art that the present invention may be used in other applications where motion tracking is useful such as, but not limited to, recognizing movement of human features such as head movements, facial features, hand movements or other body movements. The present invention can also be used in 2 dimensional, 3 dimensional and 4 dimensional (3D+time) medical analyses of anatomical structures such as the heart, lungs or tumors that are evolving over time.

Figure 1:
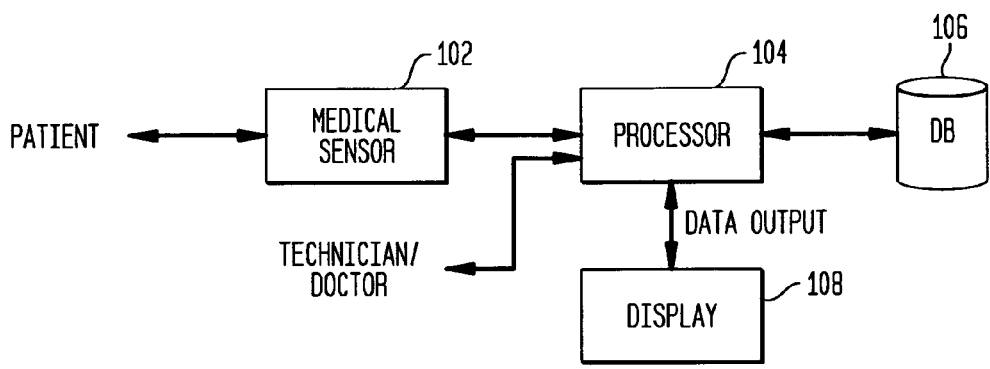
FIG. 1 is a block diagram of an exemplary system for implementing a method for tracking local deformable motion of an object in accordance with the present invention.

For purposes of describing the present invention, an example will be described for tracking the endocardial wall of the left ventricle. FIG. 1 illustrates an exemplary architecture of an echocardiograph system that uses a method for tracking the local motion of an endocardial wall of a left ventricle in accordance with the present invention. A medical sensor 102, such as an ultrasound transducer is used to perform an examination on a patient. The sensor 102 is used to obtain medical measurements consistent with a particular medical examination. For example, a patient experiencing heart problems may have an echocardiogram performed to help diagnose the particular heart ailment. An ultrasound system provides two-, three-, and four (3D+time)-dimensional images of the heart from various perspectives.

The information obtained by the sensor 102 is communicated to a processor 104 which may be a workstation or personal computer. The processor 104 converts the sensor data into an image that is communicated to display 108. The display 108 may also communicate other graphical information or tables of information relating to the image. In accordance with the present invention, the processor 104 is also provided with data representing an initial contour of the endocardial wall. The data may be provided manually by a user such as a physician or sonographer, or automatically by the processor 104. The contour comprises a series of individual points, the movement of which is tracked by the processor 104 and illustrated on display 108. The specifics regarding how the individual points are tracked will be described in greater detail hereinafter.

In addition to data from the medical sensor 102, the processor 104 may also receive other data inputs. For example, the processor may receive data from a database 106 associated with the processor 104. Such data may include subspace models that represent potential contour shapes for the endocardial wall. These subspace models may be images of left ventricles that are representative of a plurality of patients or may be computer generated models of contour shapes based on statistical information. The processor 104 tracks the individual points of the contour shape using known approaches such as Bayesian kernel matching or optical flow-based methods. Error accumulation during tracking is remedied by using a multi-template adaptive matching framework. Uncertainty of tracking is represented at each point in the form of a covariance matrix, which is subsequently fully exploited by a subspace shape constraint using a non-orthogonal projection.

In an embodiment of the present invention, local motion of the endocardial wall is tracked as well as global motion. Global motion may be present for a number of reasons. For example, the patient's breathing or movement of the sensor by the technician may cause global motion. In order to accurately track the local motion of the endocardial wall, the global motion must be measured and compensated for in the cardiac image. The difficulty in compensating for the global motion in the cardiac image lies in the distinction of global motion and local motion. The determination of whether a movement is external (i.e., global) instead of internal (i.e., local) is very difficult. The determination can be even more difficult when the local motion of the left ventricle is irregular due to the presence of heart disease.

Figure 2:
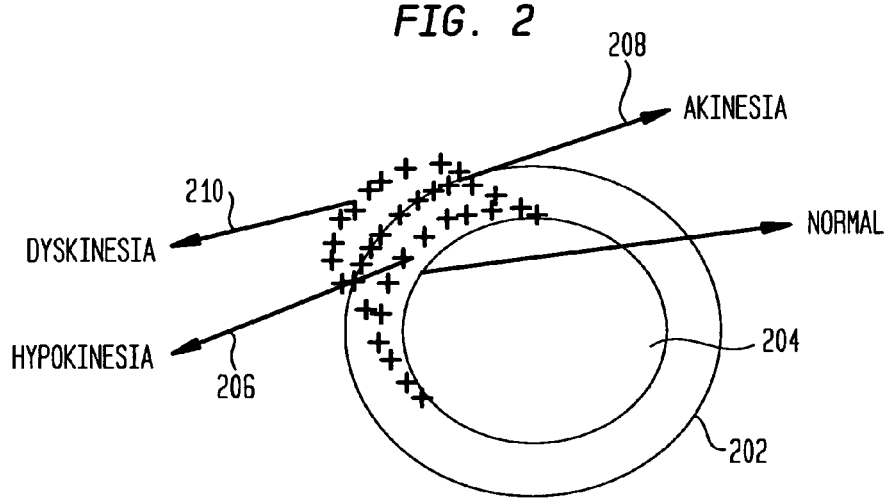
FIG. 2 illustrates four different states of a left ventricle in short axis view during systole.

As illustrated in FIG. 2, different types of heart disease can differently impact the motion of the endocardial wall. Examples of such heart diseases include dyskinesia, akinesia and hypokinesia. A normal heart wall is shown by solid lines 202, 204. Hypokinesia corresponds to a reduction of the wall motion magnitude along a segment as shown by dotted line 206. Akinesia corresponds to no motion as shown by dotted line 208. Dyskinesia can occur when the myocardium is unable to resist systolic stress as shown by dotted line 210. Because the internal movement compared to the movement of the patient is very small, the data is very sensitive to global motion. A little movement of the patient will cause very different results. For example, a normal left ventricle will look like ischemic. Traditionally, doctors remove this kind of global motion by experience or the mechanism of human eyes. However, automatic removal of the global motion will make the diagnosis much easier and more accurate.

In accordance with the present invention, global motion can be compensated for using optical flow-based methods. These methods are based on the fact that the most apparent difference between local motion and global motion is the movement of the tissues surrounding the left ventricle. If there is no global motion, the surrounding tissues do not contract or dilate like the left ventricle. However, if there is global motion, the whole image is affected by the global motion with certain translation and/or rotation in each pixel. In order to compensate for the global motion, movement in the region of tissue surrounding the left ventricle is measured to achieve a compensation measurement.

An example of an optical flow method that can be used to compensate for global motion in accordance with the present invention will now be described. The method includes four components: sampling, optical flow estimation, aligning and compensation. The first component is directed to sampling those image points that are only affected by global motion.

Figure 3:
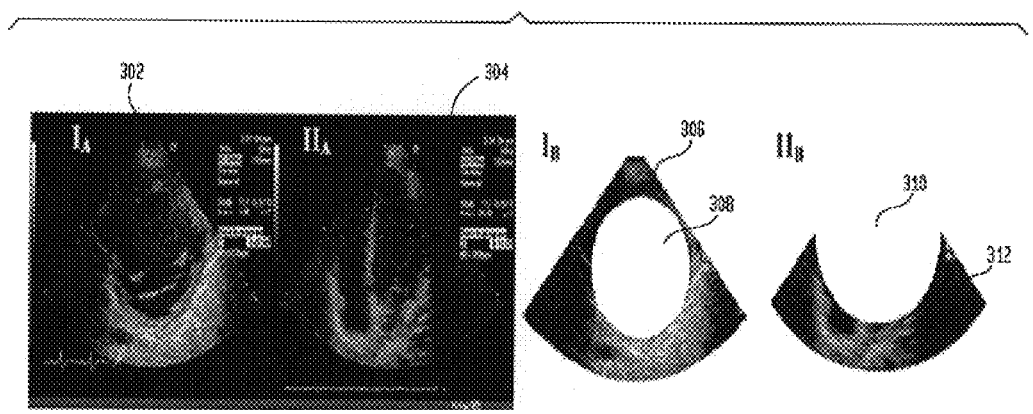
FIG. 3 is an ultrasound image of an echocardiogram in short-axis view and apical four-chamber view and respective sample areas used to compensate global motion in accordance with the present invention.

FIG. 3 is an ultrasound image of a heart that is used to illustrate the region used to calculate global motion in both apical and short axis views in accordance with the present invention. A typical ultrasound image as shown in FIG. 3 forms a fan shape 302, 304 in which the image is displayed. Image 302 depicts the echocardiogram of the heart in short-axis view and image 304 depicts the echocardiogram of the heart in apical four-chamber view. If there are N points sampled on the left ventricle border, identified as $P_1, P_2, \ldots, P_N$, the centroid point C is calculated as $\Sigma P_i/N$ where $P_f$ denotes the farthest point to C among $P_i$, $i \in \{1,N\}$, and r denotes the distance between C and $P_f$. A circle region is cut out having center C and radius 1.3×r. The constant value 1.3 is selected but can be any suitable constant value. The circle region is selected to cut out the part of the myocardium which contracts and dilates with the left ventricle. This method safely removes the regions 306, 310 inside the epicardium and leaves the surrounding areas 308, 312 for measuring global motion.

The next component of the method is to measure the motion within the selected region 308, 312. Optical flow estimation and fusion techniques are used to measure the motion of each pixel in the echocardiogram. An example of such techniques is described in D. Comaniciu, Nonparametric Information Fusion for Motion Estimation, CVPR 2003, which is incorporated by reference in its entirety. A number of points are sampled in the selected region. For each two continuous frames, the movement of each sampled point is calculated with uncertainty. Then, the points are shape matched to get the global rotation and translation. Once the global rotation and translation are obtained, compensation can be achieved.

At this point, there are a corresponding set of sampled points for every two consecutive image frames. Due to the physical characteristic of 2-D echocardiograms, global motion can comprise only translation and rotation. In order to get the translation vector t and the rotation θ, a shape aligning technique is applied. For two sets of n points $x_i$ and $x_i'$ in two consecutive frames and a transformation $x'=T_t(x)$, least square matching is performed to find the parameters t, to minimize $$E = \sum_{i=1}^{n} (x_i' - T_t(x_i))^T W_i (x_i' - T_t(x_i)) \tag{1}$$

where Wi is the weighting matrix weighting each point and reflecting the point correspondence uncertainty.

If only translation is allowed, $$T_t(x) = x + \begin{pmatrix} t_x \\ t_y \end{pmatrix},$$

where $t=(t_x, t_y)^T$.

We obtain the solution by equating $$\frac{\partial E}{\partial t} = 0$$

and get $(t_x, t_y)$ by the following equation:

$$\left(\sum_{i=1}^{n} W_i\right)\begin{pmatrix} t_x \\ t_y \end{pmatrix} = \left(\sum_{i=1}^{n} W_i(x_i' - x_i)\right) \tag{2}$$

If translation, rotation, and scaling are allowed, $$T_t(x) = \begin{pmatrix} a & -b \\ b & a \end{pmatrix} x + \begin{pmatrix} t_x \\ t_y \end{pmatrix},$$

where $t=(a, b, t_x, t_y)^T$

Again, by applying $$\frac{\partial E}{\partial t} = 0,$$

(a, b, $t_x$, $t_y$) can be obtained.

$$\begin{pmatrix} \sum x_i^T W_i x_i & \sum x_i^T W_i J x_i & \left(\sum W_i x_i\right)^T \\ \sum x_i^T W_i J x_i & \sum x_i^T J^T W_i J x_i & \left(\sum W_i J x_i\right)^T \\ \sum W_i x_i & \sum W_i J x_i & \sum W_i \end{pmatrix} \begin{pmatrix} a \\ b \\ t_x \\ t_y \end{pmatrix} = \begin{pmatrix} \sum x_i^T W_i x_i' \\ \sum x_i^T J W_i x_i' \\ \sum W_i x_i' \end{pmatrix} \tag{3}$$

Although a solution like in equation (3) can be obtained when translation, rotation and scaling are all allowed, it is not trivial to get the solution when only translation and rotation are allowed as in the present invention. The reason is that when only translation and rotation are allowed the problem is $$T_t(x) = \begin{pmatrix} a & -b \\ b & a \end{pmatrix} x + \begin{pmatrix} t_x \\ t_y \end{pmatrix},$$

but there is a nonlinear constraint $a^2+b^2=1$ now.

To solve this problem, the global rotation $\theta$ cannot exceed a certain range. In most instances, $\theta$ is between $-5°$ and $5°$. To be robust for all degrees between $-10°$ and $10°$, the translation $(t_x, t_y)$ is calculated by equation (2) and then t is found which minimizes E in equation (1).

$$t = \underset{-10° \le \theta \le 10°}{\arg\min} \left\{ E \left| \left( \sum_{i=1}^{n} W_i \right) \begin{pmatrix} t_x \\ t_y \end{pmatrix} = \left( \sum_{i=1}^{n} W_i(x'_i - x_i) \right) \right. \right\},$$

where $E$ is defined in (1)

Once t is found for all of the image frames, the compensated results can be obtained. The compensation result can be obtained for any particular image frame m by:

$$f'_m = R_{m-1}^{-1}(R_{m-2}^{-1}( \ldots (R_0^{-1}(f_m - t_0)) \ldots ) - t_{m-2}) - t_{m-1}$$

where $f_0, \ldots f_n$ represent n consecutive frames;
$t_i$ represents the translation vector from frame i to frame i+1;
$R_i$ represents the translation matrix from frame I to frame i+1.

The Global Motion by Optical Flow (GMCOF) algorithm is as follows:

---

1. Frame $f^\theta \leftarrow$ a specific frame

2. Frame $f^d \leftarrow$ a next frame

3. Point F0_points[n] = Random_sample(f0); //random sample n points in frame f0
4. float W[n][n];    // the uncertainty matrix
5. Point F1_points[n] = Optical_Flow_Estimation(F0_points, W);
6. float $T_v$, $T_h$, $\theta$, // the vertical translation, horizontal translation, and the rotation
7. Least_Square_Shape_Matching(F0_points, F1_points. n, W, &$T_v$, &$T_h$, &$\theta$);

8. Frame $f^c \leftarrow R \times f^\theta + T$;

9. $R \leftarrow \begin{bmatrix} \cos\theta & -\sin\theta \\ \sin\theta & \cos\theta \end{bmatrix}$, $T \leftarrow [T_v, T_h]$, 10. $f_C^m = R_{m-1}^{-1}(R_{m-2}^{-1}(\ldots(R_0^{-1}(f^m - T_0))\ldots) - T_{m-2}) - T_{m-1}$ // $f_C$ denotes compensated results

---

Other methods can be used to compensate for global motion. Since cardiac motion is periodic, it is assumed for a period P that the features (i.e., shape) of a certain frame I and any frame (i±nP) should be nearly the same without global motion where n is a positive integer. In other words, if there is a global motion causing the left ventricle contours to translate or rotate by a certain degree, a determination can be made as to the differences between frame I and frame (i±nP) to identify the global translation and rotation.

To calculate the period of cardiac motion, the area of the left ventricle in each frame is calculated based on the points on the left ventricle wall contour. FIG. 4 illustrates a graph depicting the change in size of the left ventricle area over time during the cardiac motion. The vertical axis of the graph is the size of the left ventricle area, and the horizontal axis is time. Autocorrelation analysis is used to identify P. The purpose of autocorrelation analysis is to search for periodicity within datasets. In the autocorrelation analysis, a set of equal time "bins" are defined. Each bin has the size (total time)/(# of bins). These bins correspond to time differences between pairs of points in the dataset. For every pair of points in the dataset, the absolute value of the difference between their time values is used to identify the particular bin to which it corresponds. The absolute value of the difference between the magnitude values of the pair of points is then added to the bin. Finally, after each pair of points has been considered, the values in each bin are averaged by dividing the sum of the magnitudes in that bin by the number of pairs of points which corresponded to that bin.

With P, the left ventricle contours at the first from 0 and the frame 0+P can be matched to get the global translation and rotation. The points are matched on the contour instead of in the sample area. The rotation and translation at frames in between frames 0 and P can be obtained by interpolation techniques. The Global Motion Compensation by Period (GMCP) algorithm is as follows:

---

1. Frame $f^\theta \leftarrow$ a specific frame

2. Frame $f^d \leftarrow$ a next frame

3. Point F0_points[m] = GetContour($f^\theta$); //get m points on LV contour at frame $f^\theta$
4. Point FP_points[m] = GetContour($f^P$); //get m points on LV contour at frame $f^P$
5. float $T_v$, $T_h$, $\theta$; //the vertical translation, horizontal translation, and the rotation
6. Least_Square_Shape_Matching(F0_points, FP_points, n, &$T_v$, &$T_h$, & $\theta$);
7. Compensation($f^\theta$, $f^P$, W, $T_v$, $T_h$, $\theta$)

8. Frame $f^d \leftarrow R_i \times f^\theta + T_i$;

9. $R_i \leftarrow \begin{bmatrix} \cos\left(\theta * \dfrac{i}{m}\right) & -\sin\left(\theta * \dfrac{i}{m}\right) \\ \sin\left(\theta * \dfrac{i}{m}\right) & \cos\left(\theta * \dfrac{i}{m}\right) \end{bmatrix}$, $T_i \leftarrow (i/m) [T_v, T_h]$, 10. $f_C^i \leftarrow R_i^{-1}(f^i - T_i)$ // $f_C$ denotes the compensated result

---

In accordance with another embodiment of the present invention, an automatic method that integrates robust optical flow computation with multiple appearance models and robust estimation of global motion parameters is described. First, local motion vectors with their uncertainty are computed on a selected number of control points. The location of the control points must be carefully chosen so that they sit inside the ultrasound fan (FIG. 3) and not correspond to image regions containing the myocardial wall of the left ventricle. The image region associated with the useful ultrasound signal is automatically detected based on the fact that the corresponding pixels have a high intensity variation in time due to motions and speckle noise. Given the reference image and the corresponding location of the myocardial wall contour, a mask for the candidate locations of the control points is built. The control points are placed radially with respect to the tip of the ultrasound fan in a band inside the mask. The band is determined by building a histogram of the number of allowed positions (given the mask) for each radius with the tip of the fan as the center. The region with the highest density in the histogram will correspond to the band location.

The control points are then independently tracked in the subsequent frames using robust optical flow techniques with multiple appearance models. The tracking method is able to cope with the difficulties of ultrasound imaging: signal dropout, poor signal to noise ratio or appearance changes. As a result of the estimation process, the control point location and its uncertainty can be represented by a covariance matrix.

For global motion, a 2D rotational model is used where the tip of the ultrasound fan is the origin of the coordinate system. The model corresponds to in plane rotations of the ultrasound probe with respect to the heart and also approximates small translations. The angular parameter is determined with respect to the reference frame for each control point. The final estimate is the result of a weighted least squares procedure where the weights are given by the inverse of the covariance matrices. The result is the maximum likelihood estimate given the measurements and their uncertainty characterized by covariance matrices.

In another embodiment of the present invention, uncertainty in system dynamics and statistical shape constraints are decoupled to provide a unified framework for fusing a subspace shape model with system dynamics and measurements with heteroscedastic noise. Models are built for coupled double-contours so that more information can be integrated especially for very noisy data. The double contour method also achieves better preservation of topology. To accommodate individual shape characteristics, the generic shape model is strongly adapted using information given about the current case. The subspace model can take the form of a specific subspace distribution, e.g., a Gaussian, or a simple subspace constraint, e.g., eigenspace model. A shape tracking method is disclosed in co-pending patent application Ser. No. 10/794,476 filed Mar. 5, 2004, entitled "System and Method for Tracking a Global Shape of an Object in Motion" which is incorporated by reference in its entirety.

As described above, in shape tracking applications noise is a big problem. Particularly in medical imaging applications, ultrasound is the noisiest among common medical imaging modalities such as Magnetic Resonance Imaging (MRI) or Computed Tomography (CT). Echocardiogram images (i.e., ultrasound heart images) are even worse with respect to noise due to the fast motion of the heart muscle and respiratory interferences.

In accordance with the present invention, left ventricle borders are tracked in echocardiography images. Various views of the left ventricle can be tracked such as, but not limited to apical two- or four-chamber views and parasternal long and short axis views. Landmark points are assigned based on anatomic features such as apex, papillary muscles, and septum. Some variability on the location of the landmark points can be tolerated due to the application of Strongly Adapted-Principal Component Analysis SA-PCA. The contours are aligned to cancel out global translation, rotation and scaling. PCA is then performed and the original dimensionality is reduced to retain 80-97% of energy, separately tuned for each model.

FIGS. 5a-5d illustrates the dominant eigenshapes without splining for two views of the left ventricle along with their model for both single and double contours. FIG. 5a illustrates the dominant eigenshapes for a single contour of an apical view of an endocardial wall of a left ventricle. FIG. 5b illustrates the dominant eigenshapes for a single contour of a short axis view of an endocardial wall of a left ventricle. FIG. 5c illustrates the dominant eigenshapes for a double contour of an apical view of an endocardial wall of a left ventricle. FIG. 5d illustrates the dominant eigenshapes for a double contour of a short axis view of an endocardial wall of a left ventricle. In each of FIGS. 5a-5d, the dashed curves represent the model mean. A double contour is treated as a single point in a high dimensional space.

To measure the motion of each of the control points, an adaptation of a frame-to-frame motion estimation algorithm is used which is described in an article by Comaniciu, D., entitled "Nonparametric Information Fusion for Motion Estimation" published in the IEEE Conf. on Computer Vision and Pattern Recognition, Madison, Wis., Volume 1, (2003) which is incorporated by reference in its entirety. The algorithm presumes that the motion in a certain neighborhood can be robustly estimated as the most significant mode of some initial motion estimates (expressed by mean vectors and associated covariance matrices). The most significant mode is defined by mode tracking across scales, while the underlying mechanism for mode detection relies on the variable bandwidth mean shift.

Figure 6A:
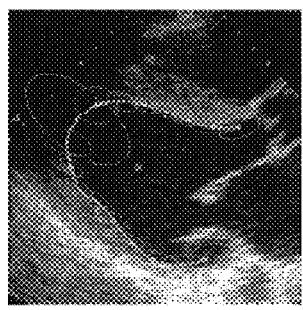
FIGS. 6a-6c illustrates the uncertainty calculated at the bottom of a pyramid for the contour points.
Figure 6B:
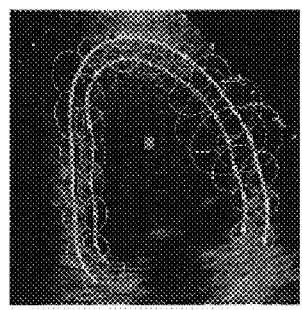
Figure 6C:
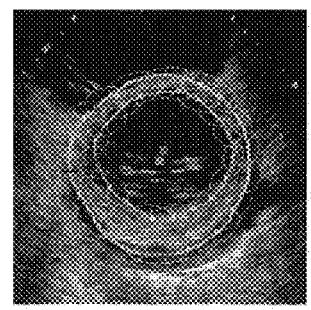

For each control point, initial estimates are computed using 17×17 windows and the results are fused on n=5×5 neighborhoods. A pyramid of three levels is employed with covariance propagation across levels. FIGS. 6a-6c illustrates the uncertainty calculated at the bottom of the pyramid for the contour points. FIG. 6a illustrates a single contour for the endocardium. FIGS. 6b and 6c illustrate coupled double contours for the endocardium and epicardium.

To avoid error accumulation from image frame to image frame, the motion is computed with reference to the neighborhood of the control points in several previous frames of the sequence (i.e. the current frame is always compared to several appearance models extracted from previous frames). Since the location of the model is updated at each frame, the motion estimation process always starts with a good initialization, thereby canceling the error accumulation. The double contour approach is beneficial because it integrates more spatial information. Therefore, it can provide more robust tracking of the two borders. In many cases, the epicardium is less visible than the endocardium. A double contour image can propagate information from the endocardium to guide the localization of the epicardium (or vice versa). Furthermore, a double-contour image can better preserve topology and reduce the chance of crossing.

In accordance with another embodiment of the present invention, contour tracking can be performing by estimating local intensity distributions without assuming a predefined structure such as edges. An advantage to this approach is that intensity distributions tend to be less influenced by noise. Furthermore, this approach can track arbitrary intensity structures since the structures tend to stay consistent across frames. In accordance with the present invention, histograms can be used to represent the intensity distributions. Control points are used to represent a contour. The contour for the first frame can be manually drawn or generated automatically. Tracking begins on the second frame.

Figure 7A:
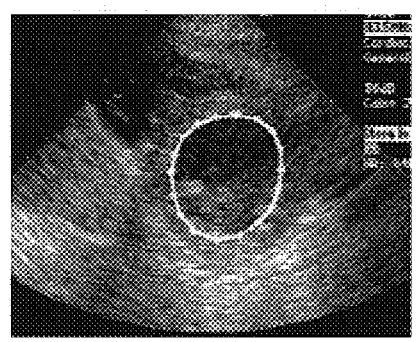
FIGS. 7a and 7b illustrate first frame initialization of a contour of an endocardial wall for a left ventricle.
Figure 7B:
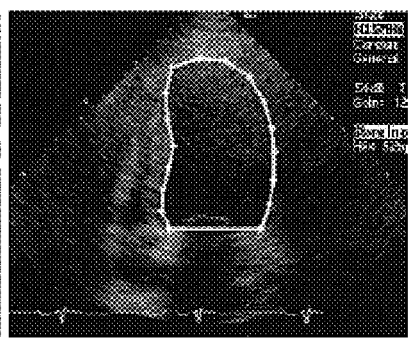

An example of frame initialization is illustrated in FIGS. 7a and 7b. FIG. 7a illustrates a parasternal view of an endocardial wall of a left ventricle. FIG. 7b illustrates an apical view of an endocardial wall of a left ventricle. In each instance, the contour around the endocardial wall was manually drawn. During tracking, the search location is updated with the previous contour assuming a $0^{th}$ order dynamic model. Alternatively, more complicated dynamic models can be used to integrate the information on the cyclic motion of the heart. Distributions obtained from the initial frame are maintained as the reference template. Alternatively, distributions from the previous frame can be used provided that compensation is made for error accumulation.

Figure 8:
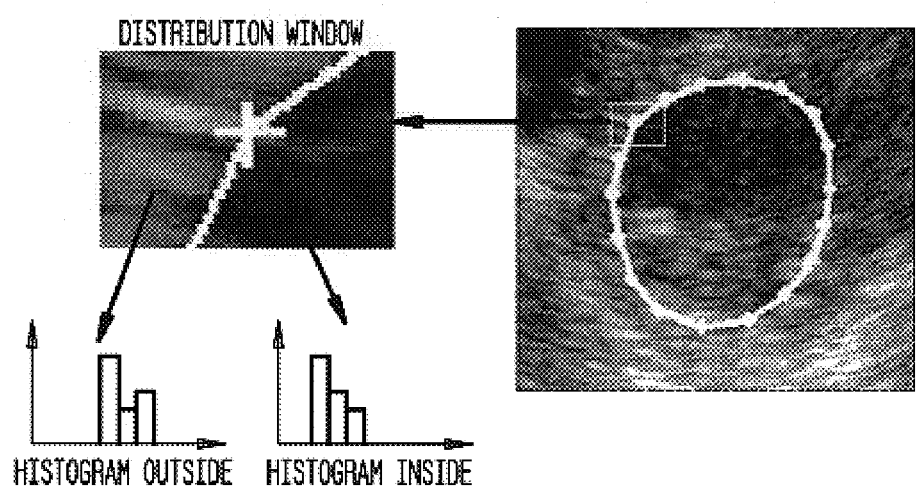
FIG. 8 illustrates a pair of histograms illustrating the intensity and spatial distribution of an echocardiograph image in accordance with the present invention.

To achieve the trade-off between global and local representation of the control point neighborhood, a dual histogram approach is used. In order to track a contour, a region of interest is split into two rectangles so that two histograms are obtained. One histogram is computed for capturing the distribution inside the contour and the second histogram is computed for capturing the distribution outside the contour. FIG. 8 illustrates examples of the two histograms in accordance with the present invention.

Next, for each window of interest, a determination must be made for each point in the window as to whether each point is inside or outside the contour. Such a determination is made difficult by the fact that the particulars about the contour for a particular image frame are not known. Assumptions about the contour can be made to simplify the calculations. For example, if the image is a parasternal short axis view, an assumption can be made that the contour is a circle and circular partitioning can be used for all control points in the frame. In accordance with the present invention, two neighboring control points are used to find the location contour orientation. The curvature is controlled by the radius d which is determined empirically using domain knowledge based on the size and shape of the left ventricle cavity.

Figure 9:
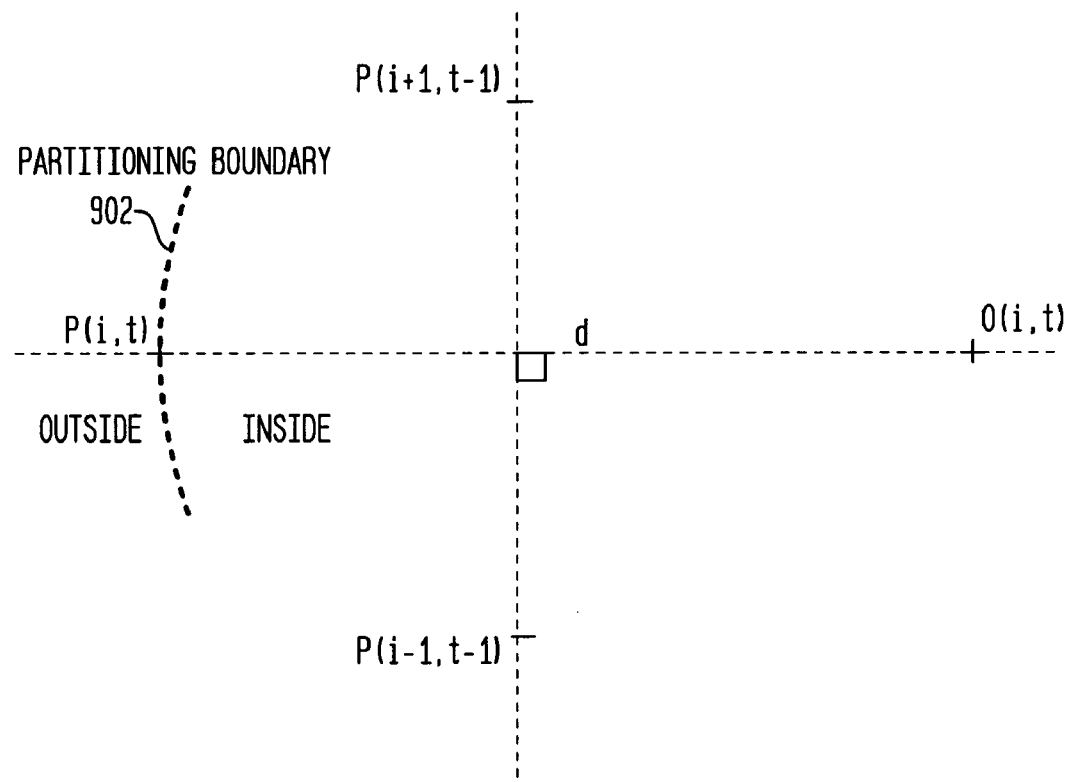
FIG. 9 illustrates a method of partitioning a window of interest to determine the inside and outside of a contour in accordance with the present invention.

FIG. 9 illustrates how the window partitioning method is employed. Dotted line 902 indicates the boundary of the contour. Element P(i,t) indicates the ith control point for frame t. Element O(i,t.) is its corresponding gravity center. Element P(i+1, t+1) is a neighboring control point. Principal Component Analysis is used to regulate the contour with prior models. In order to obtain faster and more accurate tracking, a three-level pyramid is used. The first level is a quarter-size image. The second level is a half-size image and the third level is a full-size picture. The locations from one level to the next are propagated. Using multi-scale levels is computationally efficient and the top level provides a smoothed smaller image that is less disturbed by local noise.

In accordance with another embodiment of the present invention the identification of the ultrasound signal (the fan) is automatically determined in the input images. Only the information inside the fan should be used in image analysis algorithms such as myocardial wall motion tracking, detection or global motion compensation. Automatic detection of the fan is based on the fact that the corresponding pixels have a high intensity variation over time due to object motions and speckle noise.

Figure 10A:
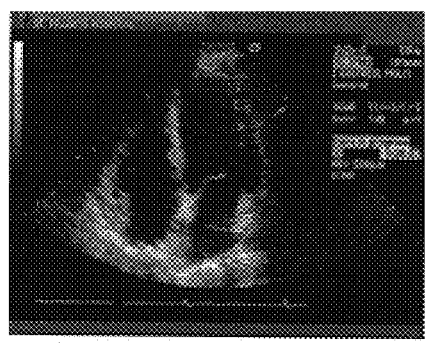
FIGS. 10a-10e illustrate a method for automatically detecting a fan in an ultrasound image in accordance with the present invention.
Figure 10B:
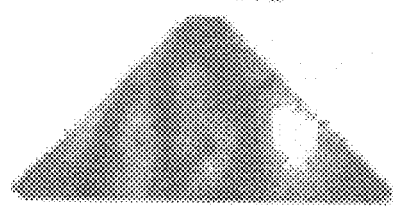
Figure 10C:
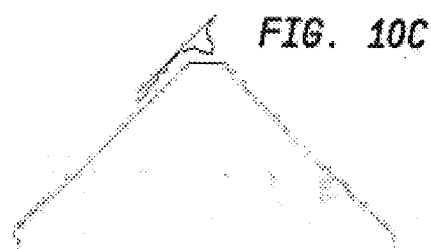

FIGS. 10a-10e illustrate an exemplary method for detecting a fan in an ultrasound image in accordance with the present invention. FIG. 10a illustrates an echocardiographic image sequence in which the image region associated with the useful ultrasound signal is automatically detected. By computing interframe intensity over time, the resulting image is shown in FIG. 10b. Using the prior knowledge of the possible locations of the fan borders, the boundary points are searched for and retained by applying a step filter oriented at ±45° on the left and respectively on the right side of the variations image. The resulting retained points are shown in FIG. 10c.

Figure 10D:
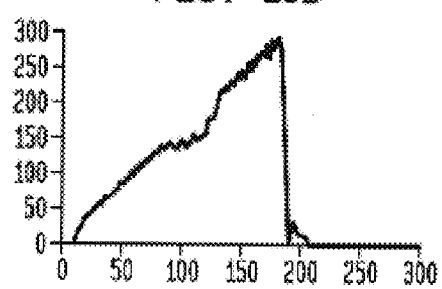
Figure 10E:
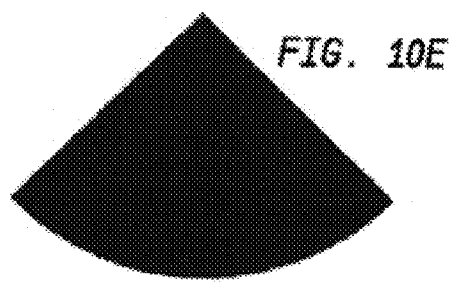

Robust regression is applied to fit a line on the retained boundary points for each of the fan sides. The solution is given by the Total Least Squares (TLS) estimate. Because the TLS estimate is not robust with respect to outliers (i.e. erroneous points inside or outside the true fan borders), we employ a biweight M-estimator. Therefore, a robust behavior of the estimation process is achieved by putting the minimized error through a biweight loss function. The solution is obtained iteratively by weighted total least squares. To start the iterations, initial estimates for the line location and the scale of the error are found by projecting the candidate points on several predetermined directions (see FIG. 10c) and finding the mode and standard deviation of the point histogram. The projection directions are determined using the prior knowledge of the possible fan orientations. The bottom of the fan is found from the radial histogram of the temporal intensity variations image. The fan radius is associated with the sudden drop in the radial histogram. FIG. 10d shows the histogram and FIG. 10e illustrates the automatically detected fan.

Having described embodiments for method for local deformable motion of an object, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

We claim:

1. A method for tracking local deformable cardiac motion of a myocardial wall of a left ventricle (LV), the left ventricle being viewed in an image sequence, the method comprises the steps of:

sampling points on a LV contour in consecutive image frames to identify LV image regions and background image regions;

estimating motion of at least one of the identified background image regions to identify those background image regions affected by global motion;

measuring the global motion in the identified background regions by measuring rotation and translation of the identified background regions;

combining motion from multiple background image regions to measure the global motion in the consecutive image frames;

compensating for the measured global motion in the LV image regions to measure local deformable motion of the myocardial wall of the LV by calculating a period of cardiac motion for the left ventricle, the period being calculated by measuring the area of the left ventricle in each frame using control points identified on the left ventricle wall and identifying changes in the size of the left ventricle over the period;

matching the LV image regions in the consecutive image frames to obtain global translation and rotation of the LV image region; and independently tracking each control point in the image sequence to determine the local deformable motion of the LV.

2. The method of claim 1 wherein said estimating motion step is performed using an optical flow estimation technique.

3. The method of claim 2 wherein said estimating motion step is performed using an information fusion technique.

4. The method of claim 1 wherein least square matching is used to measure rotation and translation of a background image region.

5. The method of claim 1 wherein the step of calculating a period of cardiac motion further comprises the steps of:
   identifying points on a wall of the left ventricle;
   measuring the change in size of the left ventricle over time by tracking movement of the identified points; and
   using autocorrelation analysis of the measured points to identify the period.

6. The method of claim 1 wherein the image is an ultrasound image.

7. The method of claim 1 wherein the image is a 3D volume of the LV.

8. A system for tracking local deformable cardiac motion of a myocardial wall of a left ventricle (LV), the left ventricle being viewed in an image sequence, the system comprising:
   means for sampling points on a LV contour in consecutive frames to identify LV image regions and background image regions;
   means for estimating motion of at least one of the identified background image regions to identify those background image regions affected by global motion;
   means for measuring the global motion in the identified background regions by measuring rotation and translation of the identified background regions;
   means for combining motion from multiple background image regions to measure the global motion in the consecutive image frames;
   means for compensating for the measured global motion in the LV image regions to measure local motion of the myocardial wall of the LV by calculating a period of cardiac motion for the left ventricle, the period being calculated by measuring the area of the left ventricle in each frame using control points identified on the left ventricle wall and identifying changes in the size of the left ventricle over the period;
   matching the LV image regions in the consecutive image frames to obtain global translation and rotation of the LV image region; and
   means for independently tracking each control point in the image sequence to determine the local motion of the LV.

9. The system of claim 8 wherein said motion is estimated using an optical flow estimation technique.

10. The system of claim 9 wherein said motion is estimated using an information fusion technique.

11. The system of claim 8 wherein least square matching is used to measure rotation and translation of a background image region.

12. The system of claim 8 wherein said means for calculating a period of cardiac motion further comprises:
    identifiying points on a wall of the left ventricle;
    measuring the change in size of the left ventricle over time by tracking movement of the identified points; and
    using autocorrelation analysis of the measured points to identify the period.

13. The system of claim 8 wherein the image is an ultrasound image.

14. The system of claim 8 wherein the image is a 3D volume of the LV.

* * * * *